United States Patent
Allen

(10) Patent No.: US 11,538,077 B2
(45) Date of Patent: Dec. 27, 2022

(54) ANY GYM FITNESS

(71) Applicant: Charles Allen, North Augusta, SC (US)

(72) Inventor: Charles Allen, North Augusta, SC (US)

( * ) Notice: Subject to any disclaimer, the term of this patent is extended or adjusted under 35 U.S.C. 154(b) by 886 days.

(21) Appl. No.: 15/629,736

(22) Filed: Jun. 21, 2017

(65) Prior Publication Data

US 2017/0364970 A1 Dec. 21, 2017

Related U.S. Application Data

(60) Provisional application No. 62/352,859, filed on Jun. 21, 2016.

(51) Int. Cl.
*G06Q 30/02* (2012.01)

(52) U.S. Cl.
CPC ................. *G06Q 30/0284* (2013.01)

(58) Field of Classification Search
CPC ............ G06Q 30/02; G06Q 30/0201; G06Q 30/0205; G06Q 30/0284; G06Q 50/01; G06Q 50/20; G06Q 50/22; G06Q 50/265; G06Q 50/30; G06Q 10/00; G06Q 10/06; G06Q 10/063114; G06Q 10/06398; G06Q 10/10; G06Q 10/107; G06Q 30/0269; G06Q 30/0206; G06Q 30/0215; G06Q 30/0226; G06Q 30/08; G06Q 30/0234; G06Q 30/0236; G06Q 30/0239; G06Q 30/0261; G16H 20/30; G16H 40/63; G16H 40/67; G16H 20/40; G16H 20/63; G16H 20/70; A63B 24/0062
See application file for complete search history.

(56) References Cited

U.S. PATENT DOCUMENTS

| | | | | |
|---|---|---|---|---|
| 2006/0161455 | A1* | 7/2006 | Anastasia | G06Q 50/22 705/2 |
| 2015/0363756 | A1* | 12/2015 | Zieger | G07C 9/00896 705/39 |
| 2020/0320811 | A1* | 10/2020 | Slavic | G07B 15/00 |

OTHER PUBLICATIONS

"Identifying terms of a linear function," Algebra House. Dec. 11, 2019 (Year: 2019).*
"Gymsurfing App Demo," Vimeo. https://vimeo.com/88313439. 2014 (Year: 2014).*
"I worked out at premium gyms around New York City without committing to expensive memberships—a new fitness app helped me do it on a tight budget," by Connie Chen. Business Insider. Jul. 2, 2018 (Year: 2018).*

(Continued)

*Primary Examiner* — Jeff Zimmerman
*Assistant Examiner* — Brian Adams Heflin
(74) *Attorney, Agent, or Firm* — Charlena Thorpe, Esq.; Incorporating Innovation LLC

(57) ABSTRACT

Implementations of a membership system for allowing users to access multiple unaffiliated gyms and paying the participating gyms are provided. In some implementations, for a plurality of users, selections of a plurality of gyms are received from each user. For each user, a fee for a time-period to be paid by the user based on the gyms selected is calculated and the fee is received from the user. A unique code is assigned to each user. When a user visits a gym that the user selected, the unique code of the user and an identification of the gym visited is received and stored. For each user and each gym selected by the user, a payment to each gym selected by the user is calculated and paid based on the percentage of time the user visited the gym during the time period.

4 Claims, 3 Drawing Sheets

(56) References Cited

OTHER PUBLICATIONS

"Fitmob Buys Gymsurfing To Add Day Passes For More Than 200 Gyms," by Ryan Lawler, Feb. 17, 2015 (Year: 2015).*
"This app can hook you up with a gym on the road for just $5," by Ryan Craggs, May 15, 2014 (Year: 2014).*
"Gym Hacking: How To Find A Great Gym Anywhere," by Will Owen, Aug. 19, 2014 (Year: 2014).*

* cited by examiner

ANY GYM FITNESS

CROSS REFERENCE TO RELATED APPLICATION

This application claims the benefit of U.S. Patent Application Ser. No. 62/352,859, which was filed on Jun. 21, 2016, and is incorporated herein by reference in its entirety.

TECHNICAL FIELD

This disclosure relates to implementations of a membership system.

BACKGROUND

With existing gym memberships, a user pays a monthly fee for access to a gym or a network of gyms that are either owned by the same owner and/or franchise gyms. The gyms in the network have the same or similar look and feel (e.g., same equipment, same classes, same hours, etc.).

DETAILED DESCRIPTION

Figure 1:
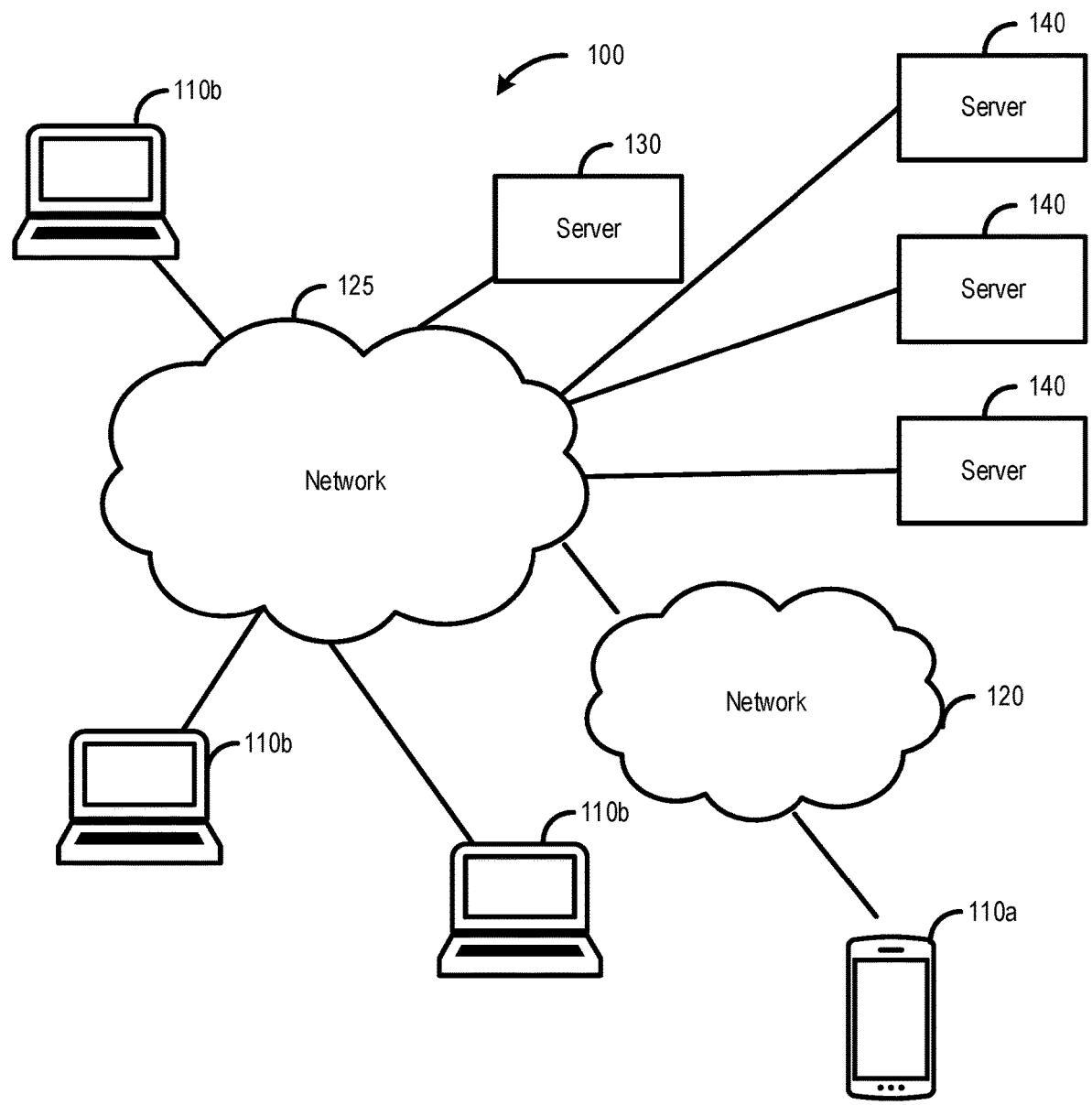
FIGS. 1 and 2 illustrate example environments for a membership system according to the present disclosure for users accessing multiple gyms and paying participating gyms.

Implementations of a membership system ("Any Gym Fitness (AGF)") for allowing users to access multiple unaffiliated gyms and paying the participating gyms are provided. In some implementations, for a plurality of users, selections of a plurality of gyms are received from each user. For each user, a fee for a time-period to be paid by the user based on the gyms selected is calculated and the fee is received from the user. In some implementations, a unique code is assigned to each user. In some implementations, when a user visits a gym that the user selected, the unique code of the user and an identification of the gym visited is received and stored. In some implementations, for each user and each gym selected by the user, a payment to each gym selected by the user is calculated and paid based on the percentage of time the user visited the gym during the time period. In this way, the AGF system allows members to pay a fee at regular intervals (e.g., monthly) for access to multiple gyms is provided.

In some implementations, the gyms can be pre-selected by a member for use for a period of time (e.g., a month). In some implementations, the fee is determined based on the gyms selected. In some implementations, a member may change his/her selection of gyms at regular intervals (e.g., monthly). In some implementation, a member can select four gyms for access based on a fee. In some implementations, a member can select more than four gyms. In some implementations, a member can select less than four gyms. In some implementations, the gyms are unaffiliated.

In some implementations, the AGF system also allows participating gyms to receive payment based on the percentage of times a member uses the gym.

In this way, the AGF system provides members increased flexibility in the field of physical exercise. Members can have access to more and different equipment, more and different locations, more and different hours of operation, more and different exercises, more and different classes, more and different trainers, etc.

In some implementations, once a member signs up via the AGF system, the member may have immediate access to the selected gyms. In some implementations, a participating gym may verify whether a person may have access to the gym via the AGF system. In some implementations, information is stored on the participating gym's network for verification. In some implementations, information may not be stored on the participating gym's network for verification.

In some implementations, a member will receive an electronic membership card on his/her phone. In some implementations, the membership card may include a numerical and/or graphical code (e.g., an optical machine-readable code, a linear bar code, matrix bar code, etc.). In some implementations, when a member visits a participating gym, the member provides his/her code for verification. In some implementations, a scanner may be used to scan the code. In some implementation, the code may be manually entered for verification. In some implementations, the code is verified locally. In some implementations, the code is verified remotely. In some implementations, the code is transmitted over a network to verify the member has access.

In some implementations, once the code is retrieved, it may be verified by cross-reference to a database. In some implementations, the code and the gym's identity may be received by the AGF system to record the member's visit to the gym to determine the amount of money to pay the gym for that member's visit.

In some implementations, a member is charged a fee to use a predetermined number of gyms for a predetermined amount of time (e.g., a month). In some implementations, the fee is determined based on the membership fee of each selected gym for that time period. In some implementations, the fee is a function of the largest membership fee of the selected gyms. In some implementation, the fee is less than the sum of the membership fees for the selected gyms. In some implementations, the fee is a function of the sum of the largest membership fee of the selected gyms, a minimum fee for each of the remaining gyms, and a processing fee.

In some implementations, each gym of the gyms selected by a user receives a portion of the monthly fee paid by the user based on the percentage of time among the selected gyms that the user visited the gym.

In some implementations, each gym of the gyms selected by a user receives a fee for the selection (an access fee) and an use fee (e.g., a portion of the monthly fee paid by the user based on the percentage of time among the selected gyms that the user visited the gym).

FIG. 1 illustrates an example environment 100 for an AGF system according to the present disclosure for users accessing multiple gyms and paying participating gyms.

As shown in FIG. 1, the environment 100 can include client devices 110a and 110b (collectively client device 110), a wireless cellular network 120, a network 125, a website 130, and gyms 140.

Client devices 110a and 110b are depicted as a mobile phone 110a and desktop computer 110b, respectively, but client devices 110 may comprise any type of computing device, such as a desktop computer system, a laptop, a smartphone, a mobile telephone, a tablet-style computer, any other handheld electronic device, or any other device capable of wireless or wired communication.

In some implementations, the client devices 110 may be used by prospective users to access the AGF system website 130 to sign up for access to multiple gyms 140. In some implementations, the client devices 110 may be used at gyms to input membership codes. In some implementations, memberships codes are inputted using optical scanners at the gyms 140.

In some implementations, the client device 110a can connect to the network 125 through a wireless cellular network 120, such as GPRS-based and CDMA-based wireless networks, as well as 802.16 WiMax and long-range wireless data networks.

Client devices 110a and 110b can interact with the website 130 via an application, such as a web browser or a native application, residing on the client devices 110a and 110b to access the AGF system described above.

Figure 2:
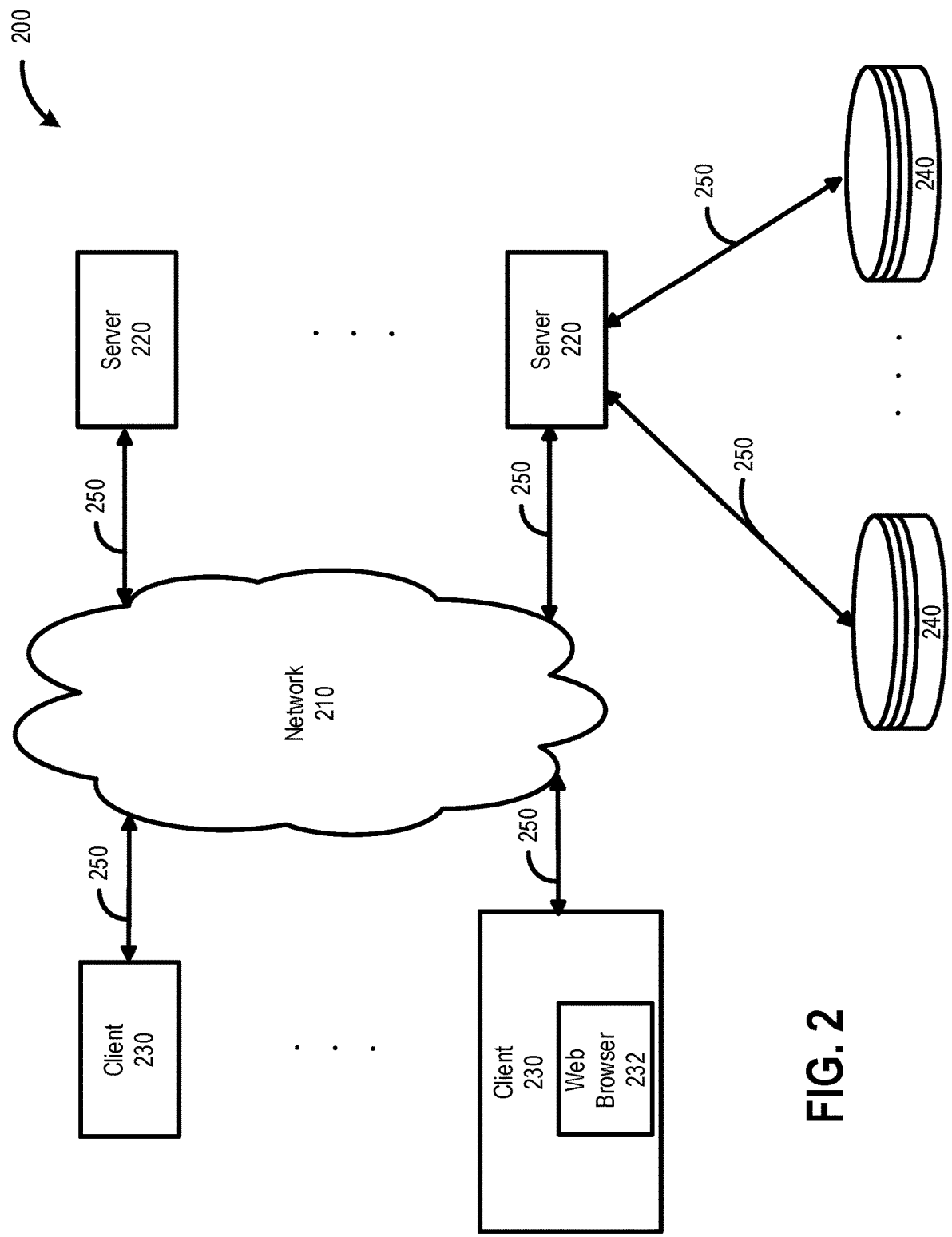

FIG. 2 illustrates another example environment 200 for an AGF system according to the present disclosure for users accessing multiple gyms and paying participating gyms.

The example environment 200 can include a network 210, one or more servers 220, and one or more clients 230. The example environment 200 also can include one or more data storage 240 linked to one or more servers 220. Particular embodiments may be implemented in network environment 200. For example, applications used to render the user interfaces to perform the functions described above (e.g., signing up, selecting gyms, inputting memberships codes, etc.) may be written in software programs hosted by one or more servers 220.

In some implementations, network 210 may be an intranet, an extranet, a virtual private network (VPN), a local area network (LAN), a wireless LAN (WLAN), a wide area network (WAN), a metropolitan area network (MAN), a portion of the Internet, or another network 210 or a combination of two or more such networks 210. The present disclosure contemplates any suitable network 210.

One or more links 250 couple a server 220 or a client 230 to network 210. In some implementations, one or more links 250 each can include one or more wired, wireless, or optical links 250. In some implementations, one or more links 250 each can include an intranet, an extranet, a VPN, a LAN, a WLAN, a WAN, a MAN, a portion of the Internet, or another link 250 or a combination of two or more such links 250. The present disclosure contemplates any suitable links 250 coupling servers 220 and clients 230 to network 210.

In some implementations, each server 220 may be a unitary server or may be a distributed server spanning multiple computers or multiple datacenters. Servers 220 may be of various types, such as, for example and without limitation, web server, file server, application server, exchange server, database server, or proxy server. In some implementations, each server 220 may include hardware, software, or embedded logic components or a combination of two or more such components for carrying out the appropriate functionalities implemented or supported by server 220. For example, a web server is generally capable of hosting websites containing web pages or particular elements of web pages. More specifically, a web server may host HTML files or other file types, or may dynamically create or constitute files upon a request, and communicate them to clients 230 in response to HTTP or other requests from clients 230. A database server is generally capable of providing an interface for managing data stored in one or more data stores.

In some implementations, one or more data storages 240 may be communicatively linked to one or more servers 220 via one or more links 250. In some implementations, data storages 240 may be used to store various types of information (selected gyms, membership codes, visits to gyms, etc). In some implementations, the information stored in data storages 240 may be organized according to specific data structures. In particular embodiment, each data storage 240 may be a relational database. Particular embodiments may provide interfaces that enable servers 220 or clients 230 to manage, e.g., retrieve, modify, add, or delete, the information stored in data storage 240.

In some implementations, each client 230 may be an electronic device including hardware, software, or embedded logic components or a combination of two or more such components and capable of carrying out the appropriate functions implemented or supported by client 230. For example and without limitation, a client 230 may be any type of computing device such as a desktop computer system, a laptop, a smartphone, a mobile telephone, a tablet-style computer, any other handheld electronic device, or any other device capable of wireless or wired communication. The present disclosure contemplates any suitable clients 230. A client 230 may enable a network user at client 230 to access network 210. A client 230 may enable its user to communicate with other users at other clients 230.

In some implementations, a client 230 may have a web browser 232, such as MICROSOFT INTERNET EXPLORER, GOOGLE CHROME, MOZILLA FIREFOX, or any other future developed web browser and may have one or more add-ons, plug-ins, or other extensions. A user at client 230 may enter a Uniform Resource Locator (URL) or other address directing the web browser 232 to a server 220, and the web browser 232 may generate a Hyper Text Transfer Protocol (HTTP) request and communicate the HTTP request to server 220. Server 220 may accept the HTTP request and communicate to client 230 one or more Hyper Text Markup Language (HTML) files responsive to the HTTP request. Client 230 may render a web page based on the HTML files from server 220 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In some implementations, a client 230 having a web browser 232 can connect to a server 220 to use the AGF system. In some implementations, input received from an user may be stored in a data storage 240 communicatively linked to the servers 220.

Figure 3:
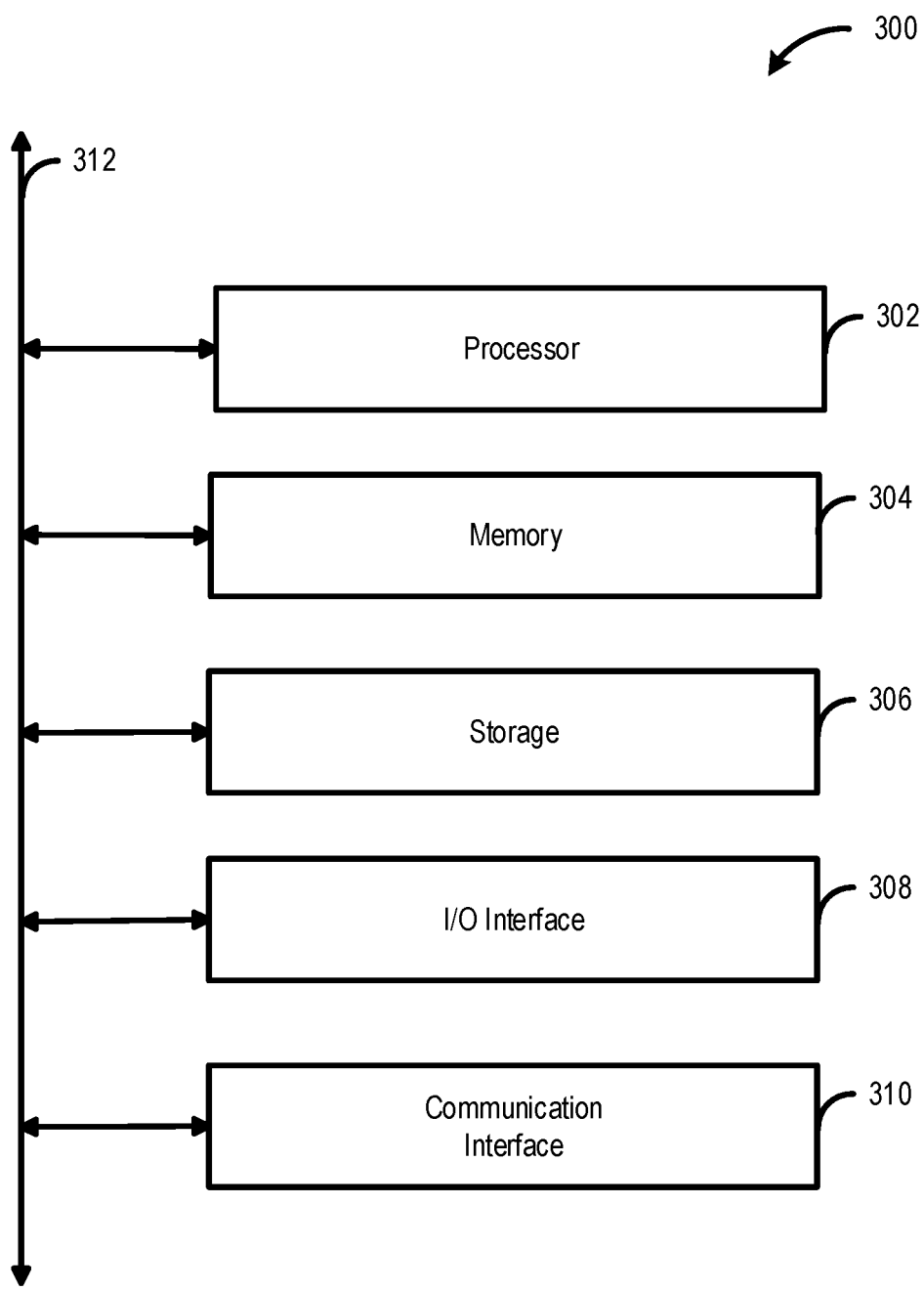
FIG. 3 illustrates an example computer system that may be used with some embodiments of the present invention.

FIG. 3 illustrates an example computer system 300, which may be used with some embodiments of the present invention. This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In some implementations, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In some implementations, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In some implementations, processor 302 may include one or more internal caches for data, instructions, or addresses. The present disclosure contemplates processor 302 including any suitable number of any suitable internal caches, where appropriate. As an example and not by way of limitation, processor 302 may include one or more instruction caches, one or more data caches, and one or more translation look-aside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In some implementations, processor 302 may include one or more internal registers for data, instructions, or addresses. The present disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In some implementations, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In some implementations, processor 402 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 402 to memory 304. Bus 312 may include one or more memory buses, as described below. In some implementations, one or more memory management units (MMUs) reside between processor 302 and memory 304 and facilitate accesses to memory 304 requested by processor 302. In some implementations, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 304 may include one or more memories 302, where appropriate. Although this disclosure describes and illustrates particular memory, this disclosure contemplates any suitable memory.

In some implementations, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In some implementations, storage 306 is non-volatile, solid-state memory. In some implementations, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In some implementations, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In some implementations, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In some implementations, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In some implementations, a computer-readable storage medium implements one or more portions of processor 302 (such as, for example, one or more internal registers or caches), one or more portions of memory 304, one or more portions of storage 306, or a combination of these, where appropriate. In some implementations, a computer-readable storage medium implements RAM or ROM. In some implementations, a computer-readable storage medium implements volatile or persistent memory. In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In some implementations, software includes one or more application programming interfaces (APIs). This disclosure contemplates any suitable software written or otherwise expressed in any suitable programming language or combination of programming languages. In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code). In some implementations, software is expressed in JAVA. In some implementations, software is expressed in Hyper Text Markup Language (HTML), Extensible Markup Language (XML), or other suitable markup language.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example. it will apparent to one of ordinary skill in the art that the invention may be used with any electronic network service, even if it is not provided through a website. Any computer-based system that provides networking functionality can be used in accordance with the present invention even if it relies, for example, on e-mail, instant messaging or other forms of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The present disclosure encompasses all changes, substitutions, variations, alterations, and modifications to the example embodiments herein that a person having ordinary skill in the art would comprehend.

The invention claimed is:

1. A computer-implemented method for allowing users to access multiple unaffiliated gyms and paying the participating gyms, the method comprising:
   for a plurality of users wherein each of the plurality of users is assigned a unique code, for each of the plurality of users:
   receiving at a first computing device selections of a plurality of unaffiliated gyms, wherein the user's selections are transmitted over a first network connection;
   computing a fee for a time-period to be paid based on the gyms selected prior to use of any of gyms selected for the time-period and receiving the fee;
   receiving at the first computing device the unique code assigned to the user and an identification of at least one gym visited during the time-period, wherein the unique code and the gym identity are transmitted over a second network connection from at least one computing device; and
   sharing the fee received among the gyms selected by;
   calculating, for each gym selected, a payment to the gym of a portion of the fee received wherein the calculation is made after the time period based on the percentage of times the unique code was received for the gym during the time period; and
   for each gym selected, paying the gym after the time period based on the payment calculated for the gym.

2. The computer-implemented method of claim 1, further comprising for each unaffiliated gym, storing a membership fee of the-unaffiliated gym wherein computing the fee for a time-period to be paid is based on the stored membership fee of each selected unaffiliated gym for the time period and wherein the computed fee for the time-period to be paid is less than the sum of the membership fees for the selected gyms.

3. The computer-implemented method of claim 2, wherein for each user and each gym selected by the user, the gym is paid a predetermined access fee and the calculated portion of the fee received for the gym.

4. The computer-implemented method of claim 1, wherein for each user and each gym selected by the user, the computed fee for a time-period to be paid is greater than the sum of the largest membership fee of the gyms selected, a predetermined minimum fee times a constant, C, and a predetermined processing fee, where C is the number of selected gyms minus one.

* * * * *